United States Patent
Li et al.

(10) Patent No.: US 10,944,628 B2
(45) Date of Patent: Mar. 9, 2021

(54) NETWORK OPERATION SUPPORT SYSTEM AND NETWORK DEVICE MANAGEMENT METHOD

(71) Applicant: Chengdu SK Spruce Technologies Co., Ltd., Chengdu (CN)

(72) Inventors: Bingjun Li, Chengdu (CN); Zhifei Zhang, Chengdu (CN); Yongcheng Lei, Chengdu (CN); Hua Chen, Chengdu (CN)

(73) Assignee: CHENGDU SK SPRUCE TECHNOLOGIES CO., LTD., Chengdu (CN)

( * ) Notice: Subject to any disclaimer, the term of this patent is extended or adjusted under 35 U.S.C. 154(b) by 0 days.

(21) Appl. No.: 16/472,396

(22) PCT Filed: Dec. 12, 2017

(86) PCT No.: PCT/CN2017/115708
§ 371 (c)(1),
(2) Date: Jun. 21, 2019

(87) PCT Pub. No.: WO2018/113556
PCT Pub. Date: Jun. 28, 2018

(65) Prior Publication Data
US 2019/0363934 A1    Nov. 28, 2019

(30) Foreign Application Priority Data

Dec. 22, 2016  (CN) .......................... 201611203589.0

(51) Int. Cl.
*H04L 12/24* (2006.01)
*H04L 29/08* (2006.01)

(52) U.S. Cl.
CPC ...... *H04L 41/0806* (2013.01); *H04L 41/0273* (2013.01); *H04L 41/04* (2013.01); *H04L 67/16* (2013.01)

(58) Field of Classification Search
CPC . H04L 41/0806; H04L 41/0273; H04L 41/04; H04L 67/16; H04L 43/0817; H04L 41/0246; H04L 41/50
(Continued)

(56) References Cited

U.S. PATENT DOCUMENTS 10,515,212 B1 * 12/2019 McClintock .......... G06F 21/562
10,657,019 B1 *  5/2020 Chopra .................. H04L 41/12
(Continued)

FOREIGN PATENT DOCUMENTS

CN    103973497 A    8/2014
CN    104158910 A    11/2014
(Continued)

OTHER PUBLICATIONS

First Office Action for Priority Application No. CN201611203589.0 dated Oct. 26, 2018; including translation.
(Continued)

*Primary Examiner* — Michael Won
(74) *Attorney, Agent, or Firm* — Billion & Armitage

(57) ABSTRACT

Provided are a network operation support system and a network device management method, belonging to the technical field of communications. The system uses a micro-service architecture realized based on a container, and the system itself has a good expansibility and availability, and supports automation and layout in a cloud environment. In addition, the system also uses a main database to synchronously store operating data of various micro-services for unified maintenance of the data, thereby improving the analysis efficiency of the system.

13 Claims, 1 Drawing Sheet

(58) Field of Classification Search
USPC .......................................................... 709/220
See application file for complete search history.

(56) References Cited

U.S. PATENT DOCUMENTS

| | | | |
|---|---|---|---|
| 10,713,664 B1* | 7/2020 | Alagappan | G06F 40/205 |
| 2016/0112475 A1* | 4/2016 | Lawson | H04L 67/02 |
| | | | 709/204 |
| 2016/0124742 A1 | 5/2016 | Rangasamy et al. | |
| 2016/0337175 A1* | 11/2016 | Rao | H04L 41/12 |
| 2018/0069806 A1* | 3/2018 | Kumar | H04L 47/827 |
| 2018/0083835 A1* | 3/2018 | Cole | H04L 41/12 |
| 2018/0164791 A1* | 6/2018 | Debes | G05B 19/41855 |
| 2019/0020665 A1* | 1/2019 | Surcouf | H04L 9/3236 |
| 2019/0089809 A1* | 3/2019 | Theebaprakasam | G06F 11/3082 |
| 2019/0140903 A1* | 5/2019 | Ahuja | H04L 67/1002 |
| 2019/0182058 A1* | 6/2019 | Yamaoka | H04L 41/5022 |
| 2019/0312900 A1* | 10/2019 | Ahuja | H04L 63/20 |
| 2019/0340108 A1* | 11/2019 | Yabusaki | G06F 11/3692 |
| 2020/0045117 A1* | 2/2020 | Ross | H04L 67/10 |
| 2020/0120000 A1* | 4/2020 | Parthasarathy | H04L 67/1002 |
| 2020/0233403 A1* | 7/2020 | Gelbke | H04L 67/10 |

FOREIGN PATENT DOCUMENTS

| | | |
|---|---|---|
| CN | 105550130 A | 5/2016 |
| CN | 105808414 A | 7/2016 |
| CN | 106533804 A | 3/2017 |
| WO | 2016195562 A1 | 12/2016 |

OTHER PUBLICATIONS

International Search Report and Written Opinion for PCT/CN2017/115708 dated Feb. 28, 2018; including translation of Search Report.

* cited by examiner

NETWORK OPERATION SUPPORT SYSTEM AND NETWORK DEVICE MANAGEMENT METHOD

CROSS-REFERENCE TO RELATED APPLICATION

The present disclosure claims the priority to Chinese patent application with the filing number 2016112035890, filed on Dec. 22, 2016 with the Chinese Patent Office and entitled "Network Operation Support System", the contents of which are incorporated by reference herein in entirety.

TECHNICAL FIELD

The present disclosure relates to the technical field of communications, in particular to a network operation support system and a network device management method.

BACKGROUND ART

A conventional WI-FI network operation support system operates on a server in a network management center, and a system architecture thereof still follows a conventional client-server structure up to now. As being deployed at a server level, the network operation support system depends on NMS (Network Management System) deployment software, and the system itself has no layout.

In recent years, with the rising and widespread application of the cloud technology, due to its characteristics such as cost saving, good expansibility (scalability) and availability, easy layout and implementation, private cloud and public cloud become better choices of the network operation support system, and new services evolve from the cloud environment. However, existing cloud-based WI-FI network operation support systems are deployed on the basis of virtual servers, and depend on cloud deployment software of an IaaS (Infrastructure as a Service) mode. As being deployed at a virtual machine level, the functional layout of the operation support system depends on an NMS server, and the system itself is difficult to be extended, thus resulting in an unfavorable availability.

SUMMARY

In view of this, an object of the present disclosure is to provide a network operation support system, so as to alleviate at least one of the above problems.

A preferred embodiment of the present disclosure provides a network operation support system, wherein the system includes: a pre-configuration micro-service, configured to receive configuration data input through a user layer interface, and store the configuration data in a configuration database; a configuration download micro-service, configured to acquire the configuration data from the configuration database and then transmit the configuration data to a network device; a network management micro-service, configured to monitor and manage the configuration data and an operating state of the network device, and generate an analysis report according to data acquired in a monitoring and managing process; an analysis micro-service, configured to provide algorithm support to all analysis requirements of the network operation support system; and a main database, configured to synchronously store operating data of each micro-service and data models among operating data of different micro-services, so as to perform unified maintenance of the data.

Optionally, the main database is a graph database configured to establish the data models among operating data of different micro-services using a graph structure.

Optionally, each micro-service in the network operation support system is realized on the basis of an independent container, and operating data of each micro-service is stored in at least one mode of three data storage modes, i.e. database storage, file storage and memory writing or caching.

Optionally, the system further includes a communication micro-service, wherein the network management micro-service, the configuration download micro-service and the communication micro-service perform information interaction with each other by means of a message queue, and wherein a process of the network management micro-service monitoring and managing the configuration data of the network device includes:

the network management micro-service sending a configuration download or upgrade request to the configuration download micro-service by means of the message queue; the configuration download micro-service acquiring corresponding configuration data from the configuration database according to the configuration download or upgrade request, then sending the acquired configuration data to the communication micro-service; and the communication micro-service sending the configuration data to the network device, after receiving the configuration data.

Optionally, the system further includes: a business operation micro-service, configured to perform operation management on business of the network operation support system, wherein the operating data of the business operation micro-service is stored in an operation relational database (relationship database), and the main database is connected with the operation relational database, so as to synchronously store operating data of the business operation micro-service.

Optionally, the system further includes: a data collection and aggregation micro-service, configured to collect log and statistical information from the network device and each micro-service, and store the collected information into a NoSQL (Not Only SQL) database; and a diagnosis micro-service, configured to diagnose, in cooperation with the analysis micro-service, a fault of the network operation support system in real time on the basis of data stored in the NoSQL database or the main database.

Optionally, the system further includes: a fault locating micro-service, configured to remove the fault in real time according to a diagnosis result from the diagnosis micro-service.

A preferred embodiment of the present disclosure further provides a network device management method applicable to a network operation support system, wherein the network operation support system includes multiple micro-services realized on the basis of independent containers, and the method includes steps of:

receiving, by a pre-configuration micro-service, configuration data input through a user layer interface, and storing the configuration data into a configuration database;

acquiring, by a configuration download micro-service, the configuration data from the configuration database and then transmitting the configuration data to a network device;

monitoring and managing, by a network management micro-service, the configuration data and an operating state of the network device, and generating an analysis report according to data acquired in a monitoring and managing process;

providing, by an analysis micro-service, algorithm support to all analysis requirements of the network operation support system; and synchronously storing, by a main database, operating data of each micro-service and data models among operating data of different micro-services, so as to perform unified maintenance of the data.

Optionally, the configuration database includes a data list configured to record configuration data already updated by the pre-configuration micro-service, and the step of acquiring, by a configuration download micro-service, the configuration data from the configuration database and then transmitting the configuration data to a network device includes:

updating and detecting, by the configuration download micro-service, the data list according to a preset timetable; and in a case where it is found that the updated configuration data exists, acquiring, by the configuration download micro-service, all configuration data which has currently been already updated and transmitting the updated configuration data to the network device.

Optionally, the network operation support system further includes a communication micro-service, and the network management micro-service, the configuration download micro-service and the communication micro-service perform information interaction with each other by means of a message queue; and the step of monitoring and managing, by a network management micro-service, configuration data of the network device includes steps of:

sending, by the network management micro-service, a configuration download or upgrade request to the configuration download micro-service by means of the message queue;

sending, after acquiring corresponding configuration data from the configuration database according to the configuration download or upgrade request, by the configuration download micro-service, the acquired configuration data to the communication micro-service; and sending, after receiving the configuration data, by the communication micro-service, the configuration data to the network device.

Optionally, the method further includes:

performing, by a business operation micro-service, operation management on business of the network operation support system, wherein operating data of the business operation micro-service is stored in an operation relational database, and the main database is connected with the operation relational database, so as to synchronously store the operating data of the business operation micro-service.

Optionally, the method further includes:

collecting, by a data collection and aggregation micro-service, log and statistical information from the network device and each micro-service, and storing the collected information into a NoSQL database; and diagnosing, by a diagnosis micro-service, in cooperation with the analysis micro-service, a fault of the network operation support system in real time on the basis of data stored in the NoSQL database or the main database.

Optionally, the method further includes:

removing, by a fault locating micro-service, the fault in real time according to a diagnosis result from the diagnosis micro-service.

Optionally, the method further includes:

providing, by a user interface micro-service, the user layer interface in a form of graph user interface, for a user to access all micro-services via the graph user interface.

The operation support system applicable to WI-FI network provided in the embodiments of the present disclosure adopts the micro-service architecture realized on the basis of containers, the system per se has good expansibility and availability, needs no layout software, and supports automation and layout in a cloud environment, which makes it easier to realize components and services, and further evolve new services in the cloud environment. Besides, the main database is used in the system to link together the operating data of each micro-service, for performing unified data maintenance, and improving analysis efficiency of the system.

BRIEF DESCRIPTION OF DRAWINGS

In order to more clearly illustrate technical solutions of embodiments of the present disclosure, accompanying drawings which need to be used in the embodiments will be introduced briefly below. It should be understood that the accompanying drawings below merely show some embodiments of the present disclosure, therefore, they should not be considered as limitation on the scope, and those ordinarily skilled in the art still could obtain other relevant accompanying drawings according to these accompanying drawings, without using creative effort.

Figure 1:
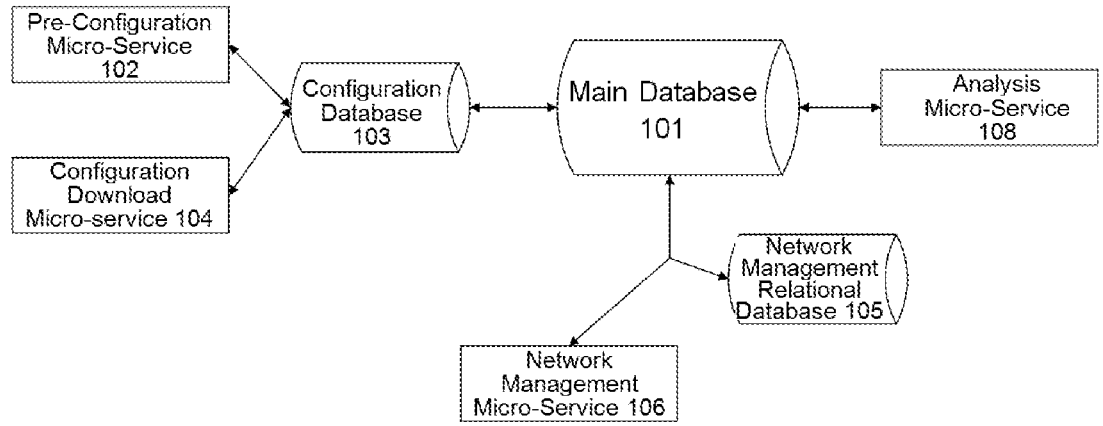
FIG. 1 shows a schematic diagram of system architecture of a network operation support system based on micro-service architecture provided in an embodiment of the present disclosure.

Reference signs: 100—network operation support system; 102—pre-configuration micro-service; 104—configuration download micro-service; 106—network management micro-service; 108—analysis micro-service; 110—user interface micro-service; 112—communication micro-service; 114—business operation micro-service; 116—data collection and aggregation micro-service; 118—diagnosis micro-service; 120—fault locating micro-service; 101—main database; 103—configuration database; 105—network management relational database; 107—message queue; 109—operation relational database; 111—NoSQL database.

DETAILED DESCRIPTION OF EMBODIMENTS

In order to make objects, technical solutions, and advantages of the embodiments of the present disclosure clearer, the technical solutions in the embodiments of the present disclosure will be described clearly and completely below in conjunction with accompanying drawings in the embodiments of the present disclosure, apparently, the embodiments described are some but not all embodiments of the present disclosure. Generally, components in the embodiments of the present disclosure, as described and shown in the accompanying drawings herein, may be arranged and designed in various different configurations.

Therefore, the detailed description below of the embodiments of the present disclosure provided in the accompanying drawings is not intended to limit the claimed scope of the present disclosure, but merely represents chosen embodiments of the present disclosure. All other embodiments obtained by those ordinarily skilled in the art based on the embodiments of the present disclosure without any creative efforts shall fall within the scope of protection of the present disclosure. It should be noted that similar reference signs and letters represent similar items in the following accompanying drawings, therefore, once a certain item is defined in one accompanying drawing, it is not needed to be further defined or explained in subsequent accompanying drawings.

Micro-service architecture (Microservices Architecture) is a type of architecture style and design mode, a development manner thereof is decomposing an application into a set of micro-services which can be independently deployed, miniaturized, and modularized, wherein each micro-service runs in an independent process, and the micro-services have clear boundaries among them, interact using a light-weight communication mechanism, and serve specific commercial objectives by means of versionized API (Application Programming Interface) and data storage.

In an embodiment of the present disclosure, the micro-service architecture is applied to development of the network operation support system, to decompose original network management services as well as operation and maintenance services, according to function boundaries, into a set of micro-service modules that can be independently deployed, compiled, and expanded at a cloud server level, render better expansibility and availability, support automation and layout in a cloud environment, and need no layout software, compared with the network operation support systems deployed at the physical server level or the virtual host level in the prior art. Besides, in the system provided in the present embodiment, unified data maintenance based on a main database solves the problem that it is hard to establish data link for operating data of various micro-services in existing micro-service structures, and further improves analysis efficiency of the system, such that in-time diagnosis on and fault removal for the system become possible.

It needs to be emphasized that the network operation support system provided in the embodiment of the present disclosure can be applied to management and operation and maintenance of a WI-FI network system, but is not limited thereto.

Below, taking the WI-FI network as an example, and in connection with the accompanying drawings, the implementation principle of the network operation support system provided in the embodiment of the present disclosure is illustrated in detail. It should be understood that the micro-service architecture provided in the following embodiment is merely exemplary, and various basic micro-services and optional services included therein may be interchangeable in other embodiments or undergo additional service designs, functional boundary division, etc. according to practical needs. The basic micro-services refer to core (essential) micro-services in the network operation support system, and the optional micro-services may refer to micro-services in the network operation support system which are configured to further optimize the system.

As shown in FIG. 1, as an embodiment, the present embodiment provides a system architecture diagram of a network operation support system 100 merely including basic micro-services and a main database 101, wherein the basic micro-services include a pre-configuration micro-service 102, a configuration download micro-service 104, a network management micro-service 106, and an analysis micro-service 108. In the present embodiment, each micro-service of the network operation support system 100 is realized on the basis of an independent container (e.g. Docker container), and each of the micro-services can act as a functional module of the network operation support system 100 that can be independently deployed and run. Functions of each micro-service shown in FIG. 1 are described below.

The pre-configuration micro-service 102 is configured to receive configuration data input through a user layer interface, and store the configuration data into a configuration database 103. That is to say, the configuration data input by the user through the user layer interface will be finally delivered to the pre-configuration micro-service 102, and persisted by the pre-configuration micro-service 102. Evidently, in other embodiments, the pre-configuration micro-service 102 further can be configured to detect effectiveness of the configuration. Besides, the configuration data also can be directly stored in the main database 101, without the need of additionally providing the configuration database 103.

The configuration download micro-service 104 is configured to acquire the configuration data from the configuration database 103 and then transmit the acquired configuration data to a network device. The network device may be a wireless controller and a wireless access point in communication connection with the wireless controller, but is not limited thereto. The wireless controller manages the wireless access point through a CAPWAP (Control and Provisioning of Wireless Access Points Protocol Specification) tunnel, and the wireless controller, after receiving the configuration data transmitted by the configuration download micro-service 104, sends the configuration data to the wireless access point through the CAPWAP tunnel.

The network management micro-service 106 is configured to monitor and manage the configuration data and an operating state for the network device, and generate an analysis report according to data acquired in the monitoring and managing process. It should be noted that in other embodiments, the network management micro-service 106 further may have other functions, for example, system management, topology management function, etc. in existing network management services.

The analysis micro-service 108 is configured to provide algorithm support to all analysis requirements of the network operation support system 100, for example, to provide a corresponding analysis algorithm when the network management micro-service 106 makes statistics of reports.

The main database 101 is configured to synchronously store operating data of each micro-service and data models among operating data of different micro-services, so as to perform unified maintenance of the data, further improving the analysis efficiency of the system.

In the present embodiment, part of the functions of the network operation support system 100 are realized or maintained by different micro-services, while different micro-services may maintain their own data using different types of databases (e.g. relational database or non-relational database). Therefore, in order to achieve synchronous management of data among different micro-services, unified storage, conversion, or synchronization of different micro-services is performed by the main database 101.

The main database 101 is realized by a graph database. The graph database establishes data models among operating data of different micro-services by means of a graph structure, so as to meet requirements of a tree-form storage structure.

It should be indicated that the operating data of each micro-service may be stored in at least one mode of three data storage modes, i.e. database storage, file storage and memory writing or caching. That is to say, in the network operation support system 100 provided in the present embodiment, the storage mode of the operating data of each micro-service is allowed to be different from that of the main database 101. For example, the pre-configuration micro-service 102 stores the configuration data into the configuration database 103, the network management micro-service 106 may store data suitable for structured storage (e.g. device warehouse) in the operating data into the network management relational database 105, and write other operating data in cache or memory.

As to the configuration download micro-service 104, more specifically, transmitting the configuration data by the configuration download micro-service generally includes two following circumstances:

A first circumstance is, in response to a configuration download or upgrade request initiated by the network management micro-service 106, acquiring configuration data corresponding to the request from the configuration database 103, and then transmitting the acquired configuration data to the network device.

A second circumstance is actively acquiring the configuration data from the configuration database 103 and then transmitting the acquired configuration data to the network device. A data list configured to record configuration data already updated by the pre-configuration micro-service 102 is stored in the configuration database 103. The configuration download micro-service 104 updates and detects the data list according to a preset timetable, and in a case where it is found that the updated configuration data exists, the configuration download micro-service 104 acquires all configuration data which has currently been already updated and transmits the updated configuration data to the network device.

Each micro-service in the network operation support system 100 provided in the present embodiment exists in a form of a service component. In some embodiments, part of the micro-services may be further divided into multiple deployable subservice components according to functional boundaries. In some other embodiments, certain two or more micro-services in the network operation support system 100 further may be merged into one service, for example, as an embodiment, the pre-configuration micro-service 102 and the configuration download micro-service 104 may be merged into one configuration micro-service which can be coordinately responsible for data configuration operation of the system.

In the present embodiment, each micro-service is accessible through the user layer interface. Besides, it should be emphasized that although information interaction relation among each micro-service is not shown in FIG. 1, mutual access among different micro-services (e.g. information interaction between the network management micro-service 106 and the configuration download micro-service 104) can be realized by means of a remote access protocol (e.g. AMQP, REST). Moreover, one micro-service generally may have information interaction with one other or even more micro-services, for example, the analysis micro-service 108 provides algorithm support to all analysis requirements in the system, therefore, it may have an information interaction relation with each of other micro-services.

Figure 2:
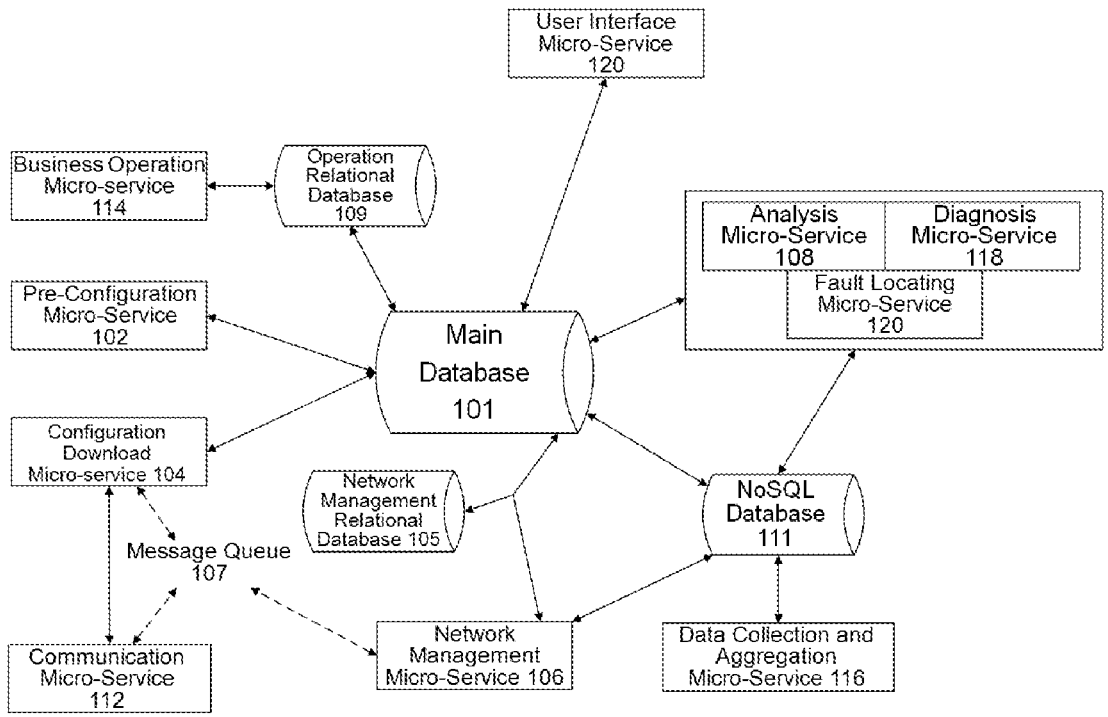
FIG. 2 shows a schematic diagram of system architecture of another network operation support system based on micro-service architecture provided in an embodiment of the present disclosure.

As shown in FIG. 2, it is a system architecture diagram of another network operation support system 100 provided in an embodiment of the present disclosure. Different from what is shown in FIG. 1, the system provided in the present embodiment further includes micro-services configured to further optimize system services.

Specifically, apart from various basic micro-services shown in FIG. 1, the system further includes a user interface micro-service 110, a communication micro-service 112, a business operation micro-service 114, a data collection and aggregation micro-service 116, a diagnosis micro-service 118, and a fault locating micro-service 120. Functions of each micro-service will be described in detail below.

The user interface micro-service 110 is configured to provide the user layer interface in a form of graph user interface, for the user to access all micro-services via the graph user interface. In the present embodiment, the configuration data received by the pre-configuration micro-service 102 may be configuration information input by the user via the graph user interface.

The communication micro-service 112 is configured to transmit the configuration data and monitor a state of data transmitting. The communication micro-service 112 may be, but not limited to, ONOS (Open Network Operating System) or OpenDayLight module. In the present embodiment, the network management micro-service 106, the configuration download micro-service 104, and the communication micro-service 112 perform information interaction with each other by means of a message queue 107 (e.g. RabbitMQ). Two possible interaction processes are illustrated below in an exemplary manner below.

First, in a process of monitoring and managing the configuration data of the network device, the network management micro-service 106 sends the configuration download or upgrade request to the configuration download micro-service 104 by means of the message queue 107, then in response to the request, the configuration download micro-service 104 acquires corresponding configuration data from the configuration database 103, then sends the acquired configuration data to the communication micro-service 112. After receiving the configuration data, the communication micro-service 112 sends the configuration data to the network device.

Second, when the communication micro-service 112 detects failure of sending the configuration data to the network device by means of the network configuration protocol (Netconf protocol), the communication micro-service 112 will send detailed information on failure of transmitting the configuration data to the message queue 107, and then the received information on transmitting failure is sent to the configuration download micro-service 104 by the message queue 107, and the information on transmitting failure is recorded into the data list of the configuration database 103 by the configuration download micro-service 104.

In the present embodiment, the function of introducing the message queue 107 is to realize decoupling and peak clipping among the micro-services. By means of notification mechanism of the message queue 107, not only one-to-multiple communication can be achieved, but also pressure to the system caused by high concurrency jitter can be reduced.

The business operation micro-service 114 is configured to perform operation management on and provide service support to business of the network operation support system 100, for example, service registration, activation, billing, and ranking. The operating data of the business operation micro-service 114 is stored in the operation relational database 109. The main database 101 is connected with the operation relational database 109, so as to synchronously store operating data of the business operation micro-service 114.

The data collection and aggregation micro-service 116 is configured to collect log and statistical information from the network device and each micro-service, and store the collected information into the NoSQL database 111 (e.g. Cassandra database). The NoSQL database 111 may store data efficiently in a cloud environment, with excellent expansibility and availability. However, due to modeless characteristic of the NoSQL database 111, it is generally hard to describe relations among data stored in the NoSQL database 111. In the present embodiment, the network management micro-service 106 may be connected with the NoSQL database 111, so as to perform analysis according to data stored in the database, and carry out monitoring and management on the network device in a better way.

The diagnosis micro-service 118 is configured to diagnose, in cooperation with the analysis micro-service 108, a fault of the network operation support system 100 in real time on the basis of data stored in the NoSQL database 111 or the main database 101, to find out a fault cause and relevant information.

The fault locating micro-service 120 is configured to remove the fault in real time according to a diagnosis result from the diagnosis micro-service 118. The fault locating micro-service 120 provides a repair solution to the fault diagnosed, and removes the fault according to the repair solution, such that the system recovers a normal working state at a minimal cost.

It should be indicated that in other embodiments, the network operation support system 100 further may include a service component of a third party application, so as to perform optimization management on the network according to data fed back by the third party application.

Besides, in some embodiments, the network operation support system 100 further may merely include part of the above optimal micro-services. For example, in some embodiments, apart from the above basic micro-services, the system merely includes the communication micro-service 112 and the business operation micro-service 114. In another embodiment, apart from the above basic micro-services, the system merely includes the data collection and aggregation micro-service 116, the diagnosis micro-service 118, and the fault locating micro-service 120.

Besides, similar to FIG. 1, the information interaction relations among part of the micro-services are not shown in FIG. 2, but it should be understood that when two different micro-services need to access each other, communication therebwtween can be realized by the message queue 107.

In a practical development process of the network operation support system 100 provided in the present embodiment, Mesos and Marathon frameworks may be adopted. Such frameworks are fully automated and integrate agile processes, and developers may in charge of development of the micro-services and containers thereof, as well as subsequent operation support and life cycle management.

Based on the above design, in the present embodiment, the functions of the network operation support system are achieved by the relatively independent micro-services realized on the basis of independent containers, such that each service function of the network operation support system 100 is modularized. Compared with the mode of realizing the functions of the network operation support system relying on one complete NMS server in the prior art, in the network operation support system 100 provided in the present embodiment, modification or expansion of each function is carried out for a corresponding micro-service functional module, such that the network operation support system 100 has quite high expansibility and availability.

The present embodiment further provides a network device management method applicable to the above network operation support system 100, wherein the network device management method includes following steps:

Step S110, receiving, by the pre-configuration micro-service, configuration data input through a user layer interface, and storing the configuration data into a configuration database.

Step S120, acquiring, by the configuration download micro-service, the configuration data from the configuration database and then transmitting the configuration data to a network device.

Further, in the present embodiment, the configuration database includes a data list configured to record configuration data already updated by the pre-configuration micro-service. The configuration download micro-service updates and detects the data list according to a preset timetable. Moreover, in a case where it is found that the updated configuration data exists, the configuration download micro-service acquires all configuration data which has currently been already updated and transmits the configuration data to the network device.

Step S130, monitoring and managing, by the network management micro-service, configuration data and an operating state of the network device, and generating an analysis report according to data acquired in the monitoring and managing process.

Further, in the present embodiment, the network operation support system further includes a communication micro-service, and the network management micro-service, the configuration download micro-service, and the communication micro-service perform information interaction with each other by means of a message queue. The network management micro-service sends a configuration download or upgrade request to the configuration download micro-service by means of the message queue. After acquiring corresponding configuration data from the configuration database according to the configuration download or upgrade request, the configuration download micro-service sends the acquired configuration data to the communication micro-service. After receiving the configuration data, the communication micro-service sends the configuration data to the network device.

Step S140, providing, by the analysis micro-service, algorithm support to all analysis requirements of the network operation support system.

Step S150, synchronously storing, by the main database, operating data of each micro-service and data models among operating data of different micro-services, so as to perform unified maintenance of the data.

Further, in the present disclosure, the method further may include step S160.

Step S160, performing, by the business operation micro-service, operation management on business of the network operation support system, wherein the operating data of the business operation micro-service is stored in the operation relational database, and the main database is connected with the operation relational database, so as to synchronously store the operating data of the business operation micro-service.

Further, in the present embodiment, the method further may include step S170.

Step S170, collecting, by the data collection and aggregation micro-service, log and statistical information from the network device and each micro-service, and storing the collected information into the NoSQL database; and diagnosing, by the diagnosis micro-service, in cooperation with the analysis micro-service, a fault of the network operation support system in real time on the basis of data stored in the NoSQL database or the main database.

Further, in the present embodiment, the method further may include step S180.

Step S180, removing, by the fault locating micro-service, the fault in real time according to a diagnosis result from the diagnosis micro-service.

Further, in the present embodiment, the method further may include step S190.

Step S190, providing, by the user interface micro-service, a user layer interface in a form of graph user interface, for the user to access all micro-services via the graph user interface.

To sum up, the network operation support system 100 deployed at the cloud server level and the network device management method provided in the embodiments of the present disclosure have better expansibility and availability, and support automation and layout in a cloud environment. Besides, since each micro-service has an independent running process, the network operation support system 100 based on the micro-service structure can realize independent and real-time deployment of the micro-services, effectively improving overall deployment efficiency of the system.

In several embodiments provided in the present disclosure, it should be understood that the system disclosed also may be realized in other manners. The embodiments described above are merely exemplary.

The technical solutions in essence or parts making contribution to the prior art or parts of the technical solutions of the present disclosure can be embodied in form of a software product, and this computer software product is stored in a storage medium, including several instructions for causing one computer device (which can be a personal computer, a server or a network device etc.) to execute all or part of the steps of the micro-service of various embodiments of the present application. The aforementioned storage medium includes various media on which program codes can be stored, such as U disk, mobile hard disk, read-only memory, random access memory, diskette or compact disk.

It should be indicated that in the present text, relational terms such as first and second are merely for distinguishing one entity or operation from another entity or operation, while it is not required or implied that these entities or operations necessarily have any such practical relation or order. Moreover, terms "including", "containing" or any other derivatives thereof are intended to be non-exclusive, thus a process, method, article or device including a series of elements not only include those elements, but also include other elements that are not listed definitely, or further include elements inherent to such process, method, article or device. Without more restrictions, an element defined with wordings "including a . . . " does not exclude presence of other same elements in the process, method, article or device including said element.

The above-mentioned are merely embodiments of the present disclosure, but the scope of protection of the present disclosure is not limited thereto, and any modification or substitution that may be easily envisaged by those skilled in the present art within the technical scope disclosed in the present disclosure should fall within the scope of protection of the present disclosure. Therefore, the scope of protection of the present disclosure should be based on the scope of protection of the appended claims.

INDUSTRIAL APPLICABILITY

Compared with the mode of realizing the functions of the network operation support system relying on one complete NMS server in the prior art, in the network operation support system provided in the present disclosure, modification or expansion of each function is carried out for a corresponding micro-service functional module, such that the network operation support system deployed at the cloud server level provided in the present embodiment has good expansibility and availability, and supports automation and layout in the cloud environment. Besides, since each micro-service has an independent running process, the network operation support system based on the micro-service structure can achieve independent and real-time deployment of the micro-services, effectively improving the overall deployment efficiency of the system.

What is claimed is:

1. A network operation support system, comprising:
a pre-configuration micro-service, configured to receive configuration data input through a user layer interface, and store the configuration data into a configuration database;
a configuration download micro-service, configured to acquire the configuration data from the configuration database and then transmit the configuration data to a network device;
a network management micro-service, configured to monitor and manage the configuration data and an operating state for the network device, and generate an analysis report according to data acquired in a monitoring and managing process;
an analysis micro-service, configured to provide algorithm support to all analysis requirements of the network operation support system;
a main database, configured to synchronously store operating data of each micro-service, and data models among operating data of different micro-services, so as to perform unified maintenance of the data;
a business operation micro-service, configured to perform operation management on business of the network operation support system, wherein operating data of the business operation micro-service is stored in an operation relational database, and the main database is connected with the operation relational database, so as to synchronously store operating data of the business operation micro-service;
a data collection and aggregation micro-service, configured to collect log and statistical information from the network device and each micro-service, and store the collected information into a NoSQL (Not Only SQL) database; and
a diagnosis micro-service, configured to diagnose in real time, in cooperation with the analysis micro-service, a fault of the network operation support system on the basis of data stored in the NoSQL database or the main database.

2. The system according to claim 1, wherein the main database is a graph database configured to establish the data models among operating data of different micro-services using a graph structure.

3. The system according to claim 2, wherein each micro-service in the network operation support system is realized on the basis of an independent container, and operating data of each micro-service is stored in at least one mode of three data storage modes, i.e. database storage, file storage and memory writing or caching.

4. The system according to claim 1, wherein the configuration database comprises a data list configured to record configuration data already updated by the pre-configuration micro-service, and a process of the configuration download micro-service acquiring the configuration data from the configuration database and then transmitting the configuration data to a network device comprises:

the configuration download micro-service updating and detecting the data list according to a preset timetable; and in a case where it is found that the updated configuration data exists, the configuration download micro-service acquiring all configuration data which has currently been already updated and transmitting the updated configuration data to the network device.

5. The system according to claim 1, further comprising a communication micro-service, wherein the network management micro-service, the configuration download micro-service and the communication micro-service perform information interaction with each other by means of a message queue, and wherein a process of the network management micro-service monitoring and managing the configuration data of the network device comprises:

the network management micro-service sending a configuration download or upgrade request to the configuration download micro-service by means of the message queue;

the configuration download micro-service acquiring corresponding configuration data from the configuration database according to the configuration download or upgrade request, then sending the acquired configuration data to the communication micro-service; and the communication micro-service sending the configuration data to the network device, after receiving the configuration data.

6. The system according to claim 1, further comprising:
a fault locating micro-service, configured to remove the fault in real time according to a diagnosis result from the diagnosis micro-service.

7. The system according to claim 1, further comprising:
a user interface micro-service, configured to provide the user layer interface in a form of graph user interface, for a user to access all the micro-services via the graph user interface.

8. The system according to claim 1, wherein the network device comprises a wireless controller and a wireless access point which is in communication connection with the wireless controller.

9. A network device management method applicable to a network operation support system, wherein the network operation support system comprises multiple micro-services realized on the basis of independent containers, and the method comprises steps of:

receiving, by a pre-configuration micro-service, configuration data input through a user layer interface, and storing the configuration data into a configuration database, acquiring, by a configuration download micro-service, the configuration data from the configuration database and then transmitting the configuration data to a network device;

monitoring and managing, by a network management micro-service, the configuration data and an operating state for the network device, and generating an analysis report according to data acquired in a monitoring and managing process;

providing, by an analysis micro-service, algorithm support to all analysis requirements of the network operation support system;

synchronously storing, by a main database, operating data of each micro-service and data models among operating data of different micro-services, so as to perform unified maintenance of the data;

performing, by a business operation micro-service, operation management on business of the network operation support system, wherein operating data of the business operation micro-service is stored in an operation relational database, and the main database is connected with the operation relational database, so as to synchronously store operating data of the business operation micro-service;

collecting, by a data collection and aggregation micro-service, log and statistical information from the network device and each micro-service, and storing the collected information in a NoSQL database; and diagnosing, by a diagnosis micro-service, in cooperation with the analysis micro-service, a fault of the network operation support system in real time on the basis of data stored in the NoSQL database or the main database.

10. The method according to claim 9, wherein the configuration database comprises a data list configured to record configuration data already updated by the pre-configuration micro-service, and the step of acquiring by a configuration download micro-service the configuration data from the configuration database and then transmitting the configuration data to a network device comprises steps of:

updating and detecting, by the configuration download micro-service, the data list according to a preset timetable; and in a case where it is found that the updated configuration data exists, acquiring, by the configuration download micro-service, all configuration data which has been currently already updated and transmitting the configuration data to the network device.

11. The method according to claim 9, wherein the network operation support system further comprises a communication micro-service, wherein the network management micro-service, the configuration download micro-service and the communication micro-service perform information interaction with each other by means of a message queue; the step of monitoring and managing by a network management micro-service the configuration data of the network device comprises:

sending, by the network management micro-service, a configuration download or upgrade request to the configuration download micro-service by means of the message queue;

sending, by the configuration download micro-service after acquiring corresponding configuration data from the configuration database according to the configuration download or upgrade request, the acquired configuration data to the communication micro-service; and sending, by the communication micro-service after receiving the configuration data, the configuration data to the network device.

12. The method according to claim 9, further comprising:
removing, by a fault locating micro-service, the fault in real time according to a diagnosis result from the diagnosis micro-service.

13. The method according to claim 9, further comprising:
providing, by a user interface micro-service, the user layer interface in a form of graph user interface, for a user to access all micro-services via the graph user interface.

* * * * *